(12) United States Patent
Sato et al.

(10) Patent No.: US 10,012,280 B2
(45) Date of Patent: Jul. 3, 2018

(54) FRICTION MATERIAL

(71) Applicant: AKEBONO BRAKE INDUSTRY CO., LTD., Tokyo (JP)

(72) Inventors: Yuki Sato, Tokyo (JP); Mikiya Haruta, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/310,144

(22) PCT Filed: May 12, 2015

(86) PCT No.: PCT/JP2015/063699
§ 371 (c)(1),
(2) Date: Nov. 10, 2016

(87) PCT Pub. No.: WO2015/174435
PCT Pub. Date: Nov. 19, 2015

(65) Prior Publication Data
US 2017/0175839 A1 Jun. 22, 2017

(30) Foreign Application Priority Data

May 16, 2014 (JP) .................. 2014-102452

(51) Int. Cl.
*C08F 8/00* (2006.01)
*F16D 69/02* (2006.01)

(52) U.S. Cl.
CPC .................. *F16D 69/025* (2013.01)

(58) Field of Classification Search
CPC ....... F16D 69/025; C08L 61/06; C08L 87/005
USPC ...................................... 525/151
See application file for complete search history.

(56) References Cited

U.S. PATENT DOCUMENTS

| | | |
|---|---|---|
| 6,596,789 B2 | 7/2003 | Nakamura et al. |
| 9,039,825 B2 | 5/2015 | Unno et al. |
| 9,086,105 B2 | 7/2015 | Unno et al. |
| 9,410,591 B2 | 8/2016 | Unno et al. |
| 2002/0006981 A1 | 1/2002 | Nakamura et al. |
| 2012/0070680 A1 | 3/2012 | Unno et al. |
| 2014/0227541 A1 | 8/2014 | Unno et al. |
| 2015/0008615 A1 | 1/2015 | Unno et al. |

FOREIGN PATENT DOCUMENTS

| | | |
|---|---|---|
| EP | 2937397 A1 * | 10/2015 |
| JP | 2000-143827 A | 5/2000 |
| JP | 2000-256650 A | 9/2000 |
| JP | 2007-084643 A | 4/2007 |
| WO | WO-2010/140265 A1 | 12/2010 |

OTHER PUBLICATIONS

Notification of Reasons for Refusal dated Jan. 23, 2018 in Japanese Patent Application No. 2014-102452 (2 pages) with an English Translation (3 pages).

* cited by examiner

*Primary Examiner* — William K Cheung
(74) *Attorney, Agent, or Firm* — Drinker Biddle & Reath LLP

(57) ABSTRACT

A friction material as a lining for a drum brake includes polytetrafluoroethylene and an acrylic rubber-modified phenol resin. In the friction material, the polytetrafluoroethylene is preferably included in an amount of 0.1% by mass to 5% by mass, and the acrylic rubber-modified phenol resin is preferably included in an amount of 1% by mass to 15% by mass.

4 Claims, No Drawings

FRICTION MATERIAL

This application is a national stage application filed under 35 USC § 371 of International Application No. PCT/JP2015/063699, filed May 12, 2015, which claims the benefit of priority from Japan patent application 2014-102452 filed May 16, 2014, the entire contents of which are incorporated by reference herein as if set forth in their entireties.

TECHNICAL FIELD

The present invention relates to a friction material to be used for passenger cars, commercial cars, railway vehicles, industrial machines, etc., particularly to a friction material capable of preventing generation of squeal during braking even after leaving it for a long time, and more specifically to brake lining to be used for the above-described applications.

Conventionally, a friction material such as brake lining is produced by using a fiber base material, a friction modifier, a filler and a binder, blending them, and performing a production process including steps such as preforming, thermoforming and finishing. In the friction material such as brake lining, there are used a fiber base material, e.g., an organic fiber, an inorganic fiber such as glass fiber, or a metal fiber such as copper fiber, an organic/inorganic friction modifier such as rubber dust, cashew dust, metal particles, ceramic particles or graphite, a filler such as calcium carbonate or barium sulfate, and a binder such as a phenol resin.

Performances such as being excellent in abrasion resistance, being high and stable in the friction coefficient, being excellent in fade resistance, generating no squeal and no abnormal noise during braking and being less likely to produce wear debris have been required for a friction material.

As a measure to reduce the brake squeal, there has been made an attempt to impart damping properties to a friction material by using a rubber-modified phenol resin as a binder or by adding a rubber powder to ingredients of the friction material, thereby increasing vibration damping to reduce the squeal.

However, conventional friction materials have a phenomenon that brake effectiveness is increased to generate the squeal during braking after leaving it for a long time or for one day. In particular, this phenomenon occurs outdoors, and under low-temperature conditions such as in winter.

Further, in a friction material which has received thermal history such as slope descending, the squeal during braking is significantly generated.

Patent Document 1 proposes a non-asbestos friction material using a mixed resin of an acrylic rubber-modified phenol resin with less deterioration in damping properties due to thermal history and a nitrile rubber-modified phenol resin excellent in damping properties at ordinary temperature, and describes that generation of the brake squeal can be suppressed because vibration properties are resistant to the thermal history and deterioration with time.

Patent Document 2 discloses a friction material, particularly a friction material for small brake lining (small BL), containing 7% by volume to 30% by volume of slaked lime and 2.0% by volume to 3.5% by volume of aluminum particles, as a friction material in which both of a ME (morning effect) phenomenon and generation of "Groan" noise after leaving it under a humid environment after high-temperature thermal history can be concurrently prevented, and describes to use, as a binder, a phenol resin, an acrylic rubber-modified phenol resin, a NBR rubber-modified phenol resin, a melamine resin, an epoxy resin, NBR, acrylic rubber (unvulcanized product) or the like.

On the other hand, as another solution, Patent Document 3 describes that it has become possible to decrease the "Groan" noise and sound pressure generated under high absolute humidity and on parking all night long by a friction material composition containing a fibrous material, a binder and a friction modifier, and further containing 0.08% by weight to 10.5% by weight of a fluororesin powder in the whole composition and a friction material obtained by subjecting the above-described friction material composition to heating compression molding.

PRIOR ART DOCUMENTS

Patent Documents

Patent Document 1: JP-A-2000-143827
Patent Document 2: JP-A-2007-84643
Patent Document 3: JP-A-2000-256650

SUMMARY OF THE INVENTION

Problems that the Invention is to Solve

A straight phenol resin is widely used as a binder of a friction material, attaching importance to heat resistance and abrasion resistance. However, in a brake lining or a brake pad using the straight phenol resin, high-frequency squeal is likely to be generated because of its high elastic modulus. As a measure therefor, a rubber-modified phenol resin excellent in flexibility is used. However, the rubber-modified phenol resin is slightly inferior in heat resistance. Accordingly, when a friction material surface becomes high temperature, a liquid decomposed product or a decomposed gas is produced by thermal decomposition of the binder, etc. to generate a lubrication action between the friction material and a counterpart material, and the friction coefficient is substantially decreased, resulting in easy occurrence of a fade phenomenon.

Further, organic materials such as resins and resin dust are deteriorated by thermal history at high temperature to increase the pore size of the friction material surface, so that it becomes likely to be affected by moisture. After leaving it, the lining surface adsorbs moisture, and becomes likely to stick to the counterpart material. Furthermore, the flexibility of the lining is reduced by receiving the thermal history. In particular, when used as the lining of a drum brake, uneven contact occurs by a sticking phenomenon due to adsorption of moisture and a reduction in flexibility of the lining to cause an increase in brake effectiveness during braking and the generation of the squeal.

Accordingly, a problem of the present invention is to provide a friction material in which the flexibility of lining is not reduced, a change in brake effectiveness during braking is small even when used as the lining of a drum brake, and uneven contact is less likely to occur, in order to prevent generation of squeal during braking after leaving it for a long time.

Means for Solving the Problems

As a result of intensive studies to solve the above-described problem, the present inventors have found that when a friction material containing polytetrafluoroethylene and an acrylic rubber-modified phenol resin is used, securing of the stable friction coefficient and a reduction in squeal during braking after leaving it for a long time are compatible with each other, thus leading to completion of the present invention.

That is, the problems of the present invention are achieved by the following (1) to (3).

(1) A friction material as a lining for a drum brake, the friction material comprising polytetrafluoroethylene and an acrylic rubber-modified phenol resin.

(2) The friction material according to (1), comprising the polytetrafluoroethylene in an amount of 0.1% by mass to 5% by mass.

(3) The friction material according to (1) or (2), comprising the acrylic rubber-modified phenol resin in an amount of 1% by mass to 15% by mass.

Advantageous Effects of the Invention

According to the present invention, an acrylic rubber-modified phenol resin and a PTFE powder are used together in a friction material composed of materials such as a fiber base material, a friction modifier and a binder for integrating these ingredients, which has made it possible to suppress an increase in brake effectiveness during braking by suppressing an influence of moisture with PTFE having water repellency and maintaining flexibility in a low-temperature region with the acrylic rubber-modified phenol resin. As a result, it has become possible to decrease the rate of change in the brake effectiveness during braking to base $\mu$.

MODE FOR CARRYING OUT THE INVENTION

Embodiments for carrying out the present invention are described in detail below, but the following embodiments are only illustrative, and the present invention is not limited thereto.

First, polytetrafluoroethylene used in the present invention is described.

The polytetrafluoroethylene (PTFE) used in the present invention may be a homopolymer of tetrafluoroethylene (TFE) or may be a copolymer with a copolymerizable monomer except for TFE, such as a fluorine-containing monomer having an ethylenically unsaturated group. Some fluorine-based polymers have a molecular weight of several million and may be appropriately used in any form such as a granular, plate-like or amorphous form, but are usually used in a powder form.

Accordingly, as the polytetrafluoroethylene as used in the present invention, examples thereof include not only a homopolymer of TFE (PTFE) but also modified polytetrafluoroethylene that is modified by copolymerizing other monomer(s) in such a small amount as not imparting melt flowability.

Examples of the fluorine-containing monomers having an ethylenically unsaturated group include hexafluoropropylene, perfluorobutene-1, perfluorohexene-1, perfluorononene-1, perfluoro(methyl vinyl ether), perfluoro(ethyl vinyl ether), perfluoro(propyl vinyl ether), perfluoro(heptyl vinyl ether), (perfluoromethyl)ethylene, (perfluorobutyl)ethylene, chlorotrifluoroethylene, etc. In particular, hexafluoro-propylene, perfluoro(n-propyl vinyl ether) and (perfluoronbutyl)ethylene are preferred. These fluorine-containing monomers may be used either individually or in combination of two or more kinds thereof. The amount of the copolymerizable monomer is usually preferably 1 mol % or less, and more preferably 0.5 mol % or less.

Among the fluorine-based polymers used in the present invention, polytetrafluoroethylene (PTFE, melting point: 327° C.) is preferred.

The polytetrafluoroethylene (PTFE) used in the present invention can be usually produced by suspension polymerization. The polymerization can be performed by using TFE alone or using TFE and a copolymerizable monomer, in an aqueous medium containing a dispersant and a polymerization initiator. The polymerization temperature ranges usually from 50° C. to 120° C., and preferably from 60° C. to 100° C. The polymerization pressure may be appropriately selected.

The PTFE particles are obtained by pulverizing the particles having an average particle diameter of several mm obtained by the suspension polymerization. In particular, the PTFE particles can be adjusted to have a desired particle diameter by pulverizing and classifying a PTFE powder having an average particle diameter of about 20 μm or less. In the present invention, a PTFE granular powder having an average particle diameter of preferably 1 μm to 10 μm, more preferably 1 μm to 6 μm is used. When the average particle diameter is 10 μm or less, water repellency is satisfactory, and the average particle diameter of 1 μm or more is preferred because brake effectiveness during braking can be secured.

Further, many chemical products are commercially available as the PTFE particles. The blending amount of the PTFE particles is preferably from 0.1% by mass to 5% by mass, and more preferably from 0.5% by mass to 3% by mass, based on the whole friction material composition. When the blending amount is 0.1% by mass or more, it is possible to secure the water repellency, and the blending amount of 5% by mass or less is preferred, because the brake effectiveness during braking can be secured.

An acrylic rubber-modified phenol resin used in the present invention is a phenol resin modified with acrylic rubber. The above-described resin contains preferably 10% by mass to 30% by mass, more preferably 15% by mass to 20% by mass of the acrylic rubber, based on the phenol resin. The amount of 10% by mass or more is preferred because flexibility can be secured, and the amount of 30% by mass or less is preferred because the brake effectiveness during braking can be secured.

The acrylic rubber used for modification of the phenol resin is a general term for rubbery elastomers mainly composed of alkyl acrylates, which have excellent heat resistance, oil resistance and weather resistance, and is a copolymer of an acrylic ester and a monomer having a functional group acting as a cross-linking group. Examples of the monomers include methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, 2-methoxyethyl acrylate, 2-ethoxyethyl acrylate, 2-butoxyethyl acrylate, acrylic acid and methacrylic acid, and ethyl acrylate or butyl acrylate is mainly used. Further, as epoxy group-containing (meth)acrylic monomers, for example, glycidyl acrylate, glycidyl methacrylate, allyl glycidyl ether, etc. are also used as copolymerizable components for cross-linking. In addition to these, there are used copolymerizable monomers such as methyl vinyl ketone, chlorine-based monomers such as 2-chloroethyl vinyl ether and vinyl chloroacetate, epoxy-based monomers such as allyl glycidyl ether, diene-based monomers such as ethylidene norbornene, olefinic monomers such as ethylene and propylene, acrylonitrile, vinyl acetate, styrene, acrylamide, vinyl chloride and vinylidene chloride.

Specific examples of the acrylic rubber include rubber of many kinds obtained by copolymerizing ethyl acrylate-butyl acrylate copolymers, ethyl acrylate-butyl acrylatemethoxyethyl acrylate copolymers, methyl acrylate-ethylene copolymers, methyl acrylate-acrylonitrile-butadiene copolymers, butadiene-butyl acrylate copolymers or ethyl acrylate-butyl acrylate-glycidyl acrylate copolymers with chlorine-based monomers such as 2-chloroethyl vinyl ether and vinyl chloroacetate or epoxy-based monomers such as allyl glycidyl ether, as the cross-linking monomers.

As the phenol resin used for obtaining the acrylic rubber-modified phenol resin, either a novolac type or a resol type may be used, and the novolac type is preferably used. Examples thereof include novolac-type phenol resins, novolac-type cresol resins, novolac-type resorcin resins, novolac-type xylenol resins, novolac-type alkyl phenol resins, novolac-type naphthol resins, novolac-type bisphenol A resins, aralkyl novolac-type phenol resins, diphenyl aralkyl novolac-type phenol resins, naphthalene novolac-type phenol resins, dicyclopentadiene novolac-type phenol resins, etc. These may be used either individually or in combination of two or more kinds thereof.

A method for modifying the phenol resin with the acrylic rubber may be any method as long as both components are homogeneously mixed and dispersed, and is not particularly limited. Examples thereof include a method of allowing a reaction of the phenol resin to proceed while adding the acrylic rubber to the phenol resin in the middle of the reaction with mixing, a method of adding the acrylic rubber to the phenol resin in a molten state after completion of a reaction, followed by mixing, etc.

Examples of curing agents for the acrylic rubber-modified phenol resin include hexamethylenetetramine, hexamethylol melamine, etc. The amount of the curing agent is preferably from 8% by mass to 12% by mass based on the acrylic rubber-modified phenol resin. Such a range is preferred because formability and suitable physical properties are secured.

The blending amount of the above-described acrylic rubber-modified phenol resin is preferably from 1% by mass to 15% by mass, and more preferably from 3% by mass to 14% by mass, based on the whole friction material composition. The blending amount of the acrylic rubber-modified phenol resin within such a range is preferred because the formability and the suitable flexibility are secured.

As for a squeal generation mechanism of the friction material, it is assumed that the squeal is generated because a friction material surface adsorbs moisture to cause sticking during leaving it for a long time, and the flexibility of the friction material is reduced, resulting in easy occurrence of uneven contact. In particular, organic materials such as resins and resin dust are deteriorated when the friction material receives thermal history. As a result, the pore size of the friction material surface is increased, resulting in a state where moisture is easily absorbed. It is considered that the presence of moisture on the friction material surface causes sticking to a counterpart material to increase the brake effectiveness during braking, thereby generating the squeal. Further, it is considered that the brake effectiveness during braking is increased to generate the squeal, because when the friction material receives the thermal history and is left, the flexibility of the friction material is reduced, resulting in easy occurrence of the uneven contact with the counterpart material. The uneven contact is likely to occur particularly in the case where the friction material is used for the drum brake lining.

According to the present invention, it is considered that PTFE and the acrylic rubber-modified phenol resin are used together, which makes it possible to suppress an increase in the brake effectiveness during braking which causes the generation of the squeal of the friction material by suppressing an influence of moisture with the use of PTFE and maintaining the flexibility in a low-temperature region with the use of the acrylic rubber-modified phenol resin.

Further, in addition to the above-described PTFE and acrylic rubber-modified phenol resin, the friction material of the present invention may contain a fiber base material having an action of reinforcing the friction material, a binder for integrating materials contained in the friction material and various friction modifiers for imparting a frictional action to the friction material and adjusting its friction performance.

The fiber base material used in the present invention is not particularly limited, and one usually used in this field is used. Examples thereof include organic fibers such as aromatic polyamide (aramid) fibers and flame-resistant acrylic fibers, metal fibers such as copper fibers and brass fibers, and inorganic fibers such as potassium titanate fibers, $Al_2O_3$—$SiO_2$-based ceramic fibers, biosoluble ceramic fibers, glass fibers and carbon fibers. These may be used either individually or in combination of two or more kinds thereof.

The blending amount of the fiber base material is preferably from 1% by mass to 30% by mass, and more preferably from 5% by mass to 15% by mass, based on the whole friction material composition.

As the binder used in the present invention, a known binder usually employed in the friction material can be used. In addition to the acrylic rubber-modified phenol resin, one or more kinds of phenol resins selected from straight phenol resins and modified phenol resins such as xylene-modified phenol resins, silicone rubber-modified phenol resins, cashew-modified phenol resins and nitrile rubber-modified phenol resins can be further used if desired. Further, examples of the binders include thermosetting resins such as melamine resins, epoxy resins and polyimide resins, and these may be used either individually or in combination of two or more kinds thereof.

The blending amount of the binder is not particularly limited. However, the amount thereof, including the blending amount of the acrylic rubber-modified phenol resin, is preferably from 5% by mass to 20% by mass, and more preferably from 10% by mass to 20% by mass, based on the whole friction material composition.

In addition to the above-described ingredients, various friction modifiers can be used as the friction modifiers according to various purposes, and various solid powder materials which are usually used in the friction material and called abrasives, fillers, solid lubricants, etc. can be used.

Examples thereof include inorganic fillers such as calcium carbonate, barium sulfate, calcium hydroxide, potassium titanate, vermiculite and mica, metal powders such as copper, aluminum, tin, bronze and zinc, abrasives such as alumina, silica, magnesia, zirconia, zirconium silicate, chromium oxide, triiron tetroxide and chromite, various rubber powders such as rubber dust, tire powders, unvulcanized rubber particles and vulcanized rubber particles, organic fillers such as resin dust, cashew dust and melamine dust, solid lubricants such as graphite, antimony trisulfide, molybdenum disulfide, coke, tin sulfide, zinc sulfide, iron sulfide and copper sulfide, etc. These may be blended either individually or in combination of two or more kinds thereof, according to frictional properties desired for products, for example, the friction coefficient, abrasion resistance, vibration properties, squeal properties etc.

The blending amount of these friction modifiers is preferably from 50% by mass to 90% by mass, and more preferably from 70% by mass to 90% by mass, based on the whole friction material composition.

The production of the friction material may be performed by a well-known production process. For example, the friction material can be produced through steps of preforming, thermoforming, heating, grinding, etc.

As a method for producing the friction material, the above-described various materials are first weighed at a predetermined composition ratio, and mixed and stirred by a mixer for 3 minutes to 5 minutes. For example, a common mixer such as an Eirich mixer may be used as the mixer. Then, the mixed raw material composition is separated into a predetermined amount, and pressurized at a surface pressure of 20 MPa to 40 MPa for 2 seconds to 5 seconds to perform the preforming, in order to form a block body. Thereafter, the thermoforming under pressure is performed at a forming temperature of 130° C. to 180° C. and a surface pressure of 20 MPa to 40 MPa for 3 minutes to 10 minutes. Further, heating is performed by a heating furnace at 150° C. to 180° C. for 4 hours to 8 hours, and the completed formed body is processed by a grinder to a predetermined width, thickness and length. Thereafter, the brake lining is fixed to a metal shoe with an adhesive or rivets.

EXAMPLES

The present invention is described more specifically below by referring to Examples, but the scope of the present invention is not limited to these Examples.

Examples 1 to 6 and Comparative Examples 1 to 4

Raw materials used in friction materials are shown below.
Acrylic rubber-modified phenol resin: manufactured by Cashew Co., Ltd.
Xylene-modified phenol resin: manufactured by Sumitomo Bakelite Co., Ltd.
Cashew-modified phenol resin: manufactured by Sumitomo Bakelite Co., Ltd.
Nitrile rubber-modified phenol resin: manufactured by Cashew Co., Ltd.
PTFE: average particle size 3.5 μm (manufactured by Sumitomo 3M Limited)

A specific production process of each friction material is as described below.

<Production of Friction Material>

The blending raw materials of each of friction material compositions having compositions shown in Table 1 were (1) mixed and stirred by an Eirich mixer for 4 minutes, and (2) the mixed and stirred materials were preformed at a surface pressure of 30 MPa for 3 seconds. Then, (3) thermoforming under pressure was performed at a forming temperature of 150° C. and a surface pressure of 30 MPa for 6 minutes, and (4) heating treatment (curing) was performed at a temperature of 180° C. for 6 hours. Further, (5) processing was performed by a grinder to a width of 100 mm, a thickness of 11.5 mm and a length of 311.5 mm, thereby producing brake lining for a drum brake, and (6) the lining was fixed to a shoe with rivets. Finally, (7) a friction surface was ground to produce a sample for evaluation.

<Evaluation Methods>

Using the brake lining produced above, the following evaluations were performed.

1. Friction Test

In conformity with JASO C407, after the brake lining was burnished 200 times at an initial speed V of 60 km/h, a deceleration α of 0.3 G and a braking start temperature of 120° C., braking was performed 5 times at an initial speed V of 10 km/h and a deceleration α of 0.1 G. The average friction coefficient in this case was defined as base μ". After leaving the brake lining outdoors overnight, braking was performed 20 times at an initial speed V of 10 km/h and a deceleration α of 0.1 G. The maximum friction coefficient obtained therein was defined as "Max. μ". The rate of change in the friction coefficient was calculated by the following equation. The results are shown in Table 1.

Rate of change (%)=Max. μ/baseμ×100

2. μ Test after Leaving in Cold Environment

The brake lining was burnished 200 times at an initial speed V of 60 km/h, a deceleration α of 0.3 G and a braking start temperature of 120° C. After leaving it outdoors overnight, braking was performed 20 times at an initial speed V of 10 km/h and a deceleration α of 0.1 G, and the generation rate of squeal of 70 dB or more was calculated by the following equation. A generation rate of 50% or more is unfavorable, a generation rate of 20% or more and less than 50% is a level free from trouble, and less than 20% is satisfactory. The results are shown in Table 1

Squeal generation rate (%)=(generation frequency of squeal of 70 dB or more)/(braking frequency)×100

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Friction material composition (% by mass) | Acrylic rubber-modified phenol resin | 14 | 14 | 14 | 14 | 3 | 7 | | 14 | | |
| | Xylene-modified phenol resin | | | | | 11 | 7 | 14 | | | |
| | Cashew-modified phenol resin | | | | | | | | | 14 | |
| | Nitrile rubber-modified phenol resin | | | | | | | | | | 14 |
| | PTFE | 0.5 | 1 | 2 | 3 | 3 | 3 | 2 | | | 2 |
| | NBR rubber powder | 5 | 5 | 5 | 5 | 5 | 5 | 5 | 5 | 5 | 5 |
| | Resin dust | 10 | 10 | 10 | 10 | 10 | 10 | 10 | 10 | 10 | 10 |
| | Calcium carbonate | 30.5 | 30 | 29 | 28 | 28 | 28 | 29 | 31 | 31 | 29 |
| | Calcium hydroxide | 7 | 7 | 7 | 7 | 7 | 7 | 7 | 7 | 7 | 7 |
| | Vermiculite | 7 | 7 | 7 | 7 | 7 | 7 | 7 | 7 | 7 | 7 |
| | Zirconium silicate | 1 | 1 | 1 | 1 | 1 | 1 | 1 | 1 | 1 | 1 |
| | Graphite | 10 | 10 | 10 | 10 | 10 | 10 | 10 | 10 | 10 | 10 |

TABLE 1-continued

|  |  | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
|  | Aramid pulp | 5 | 5 | 5 | 5 | 5 | 5 | 5 | 5 | 5 | 5 |
|  | Grass fiber | 5 | 5 | 5 | 5 | 5 | 5 | 5 | 5 | 5 | 5 |
|  | Aluminum powder | 5 | 5 | 5 | 5 | 5 | 5 | 5 | 5 | 5 | 5 |
|  | Total | 100 | 100 | 100 | 100 | 100 | 100 | 100 | 100 | 100 | 100 |
| Evaluation | Squeal generation rate (%) | 10 | 5 | 0 | 5 | 10 | 10 | 70 | 65 | 85 | 60 |
|  | Base μ | 0.35 | 0.34 | 0.35 | 0.33 | 0.34 | 0.34 | 0.34 | 0.34 | 0.34 | 0.34 |
|  | Max. μ | 0.42 | 0.39 | 0.41 | 0.38 | 0.44 | 0.43 | 0.51 | 0.52 | 0.55 | 0.48 |
|  | μ change rate (%) | 120 | 115 | 117 | 115 | 129 | 126 | 150 | 153 | 162 | 141 |

From the evaluation results of the friction materials shown in Table 1, when the acrylic rubber-modified phenol resin was used alone, the squeal was not improved (Comparative Example 2). However, when used together with polytetrafluoroethylene, the squeal in a cold environment was improved (Example 1). Further, even when polytetrafluoroethylene was used together with the xylene-modified phenol resin or the nitrile rubber-modified phenol resin, generation of the squeal could not be suppressed (Comparative Example 1 or Comparative Example 4). This shows that generation of the squeal can be significantly suppressed by combining the acrylic rubber-modified phenol resin and polytetrafluoroethylene.

Further, according to the friction materials of the present invention (Examples 1 to 6), the rate of change in Max. μ/base μ is less than 130%. However, the friction materials of Comparative Examples show the numerical value of 150% or more. The reason for this is considered that a synergistic action of polytetrafluoroethylene and the acrylic rubber-modified phenol resin could suppress an increase in the brake effectiveness during braking by suppressing the moisture content of the friction surface of the friction material and maintaining the flexibility at low temperature due to the acrylic rubber-modified phenol resin.

As a result, an increase in the brake effectiveness during braking after leaving the friction member and the generation of the squeal could be suppressed by using polytetrafluoroethylene and the acrylic rubber-modified phenol resin together.

While the present invention has been described in detail and with reference to specific embodiments thereof, it will be apparent to one skilled in the art that various changes and modifications can be made therein without departing from the spirit and scope of the invention. This application is based on Japanese Patent Application No. 2014-102452 filed on May 16, 2014, the contents of which are incorporated herein by way of reference.

INDUSTRIAL APPLICABILITY

In the present invention, a friction material which is less likely to generate squeal while maintaining a sufficient brake effectiveness level during braking can be provided, and particularly, the friction material is practically extremely useful as a lining for a drum brake.

The invention claimed is:

1. A friction material as a lining for a drum brake, the friction material comprising polytetrafluoroethylene and an acrylic rubber-modified phenol resin.

2. The friction material according to claim 1, comprising the polytetrafluoroethylene in an amount of 0.1% by mass to 5% by mass.

3. The friction material according to claim 1, comprising the acrylic rubber-modified phenol resin in an amount of 1% by mass to 15% by mass.

4. The friction material according to claim 2, comprising the acrylic rubber-modified phenol resin in an amount of 1% by mass to 15% by mass.

* * * * *